(12) United States Patent
Nishikawa et al.

(10) Patent No.: US 8,055,123 B2
(45) Date of Patent: Nov. 8, 2011

(54) METHOD AND APPARATUS FOR CUSTOMIZING CONTENT NAVIGATION

(75) Inventors: Yuko Nishikawa, La Jolla, CA (US);
Aaron John Dew, San Diego, CA (US);
Michael A. Bergeron, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1285 days.

(21) Appl. No.: 11/059,808

(22) Filed: Feb. 17, 2005

(65) Prior Publication Data

US 2006/0078297 A1    Apr. 13, 2006

Related U.S. Application Data

(60) Provisional application No. 60/614,065, filed on Sep. 28, 2004.

(51) Int. Cl.
*H04N 5/783* (2006.01)

(52) U.S. Cl. .......................................... 386/343

(58) Field of Classification Search ............... 386/68, 386/69, 70
See application file for complete search history.

(56) References Cited

U.S. PATENT DOCUMENTS

| | | | |
|---|---|---|---|
| 5,371,551 A | 12/1994 | Logan et al. | |
| 6,233,389 B1 | 5/2001 | Barton et al. | |
| 6,822,661 B2 | 11/2004 | Sai et al. | |
| 6,847,778 B1 * | 1/2005 | Vallone et al. | 386/68 |
| 2003/0202005 A1 * | 10/2003 | Sadahiro | 345/716 |
| 2004/0223737 A1 * | 11/2004 | Johnson | 386/68 |

\* cited by examiner

*Primary Examiner* — William Vaughn, Jr.
*Assistant Examiner* — Tat Chio
(74) *Attorney, Agent, or Firm* — Dickstein Shapiro LLP (57) ABSTRACT

Methods and apparatus for customizing content navigation. In one embodiment, a user navigates through pre-recorded or cached content in accordance with on one or more user preferences. Such user preferences may include one or more of content cache size, instant replay time, advance time, FF/REV speeds, slow motion speed and overshoot correction. In one embodiment, a DVR setup menu may be used to enter the user preferences via a remote control device. The user preferences may then be saved in non-volatile memory and used for navigation of subsequent content playback.

30 Claims, 9 Drawing Sheets

METHOD AND APPARATUS FOR CUSTOMIZING CONTENT NAVIGATION

CROSS REFERENCE TO RELATED APPLICATION

This application claims priority to U.S. Provisional Patent Application Ser. No. 60/614,065 filed on Sep. 28, 2004.

FIELD OF THE INVENTION

This invention relates generally to customizing content navigation, and in particular to customizing user navigation of recorded content with user-defined preference.

BACKGROUND OF THE INVENTION

The Video Cassette Recorder (VCR) has changed the lives of television (TV) viewers by allowing viewers to time-shift TV programs to match their lifestyles. Using the VCR, the viewer stores programs onto magnetic tape; this can then be played back at the viewer's convenience. The VCR gives the viewer the ability to pause the program playback whenever he desires, fast-forward through unwanted program material or commercials, and to replay favorite scenes. However, a VCR cannot both capture and play back information at the same time.

The use of a digital computer system to solve this problem has been suggested. U.S. Pat. No. 5,317,551 issued to Logan et al., on Dec. 6, 1994, teaches a method for concurrent video recording and playback. It presents a microprocessor-controlled broadcast and playback device. However, the approach requires that the microprocessor and hard disk must be very fast in order to keep up with high video rates found in television transmission.

The use of a multimedia time-warping system to solve this problem has been suggested. U.S. Pat. No. 6,233,389 issued to Barton et al. on May 15, 2001 teaches such a system, which utilizes the approach that decouples the microprocessor from the high video data rates, thereby reducing the microprocessor and system requirements, which are at a premium. The common name employed in the art to describe such a multimedia time-warping system is Digital Video Recorder (DVR).

DVR systems typically provide the ability to navigate through content which has been stored or cached. Such navigation may include, for example, fast forwarding or reversing through a stored program. However, heretofore there has been no way for a user to customize with user defined settings the DVR navigation experience. For example, current DVR implementations allow uses to navigate through content at only factory-defined speeds and formats. Thus, there is a need for a method and apparatus which enables users to customize the content presentation.

SUMMARY OF THE INVENTION

Methods and apparatus for customizing content navigation. In one embodiment, a method includes presenting content navigation options to a user and receiving, in response to the navigation options, user preferences for navigating through stored video content. The method further includes saving the user preferences to a non-volatile memory, receiving a navigation instruction from the user, and navigating through the stored video content in response to the navigation instruction and in accordance with the user preferences.

Other aspects, features, and techniques of the invention will be apparent to one skilled in the relevant art in view of the following detailed description.

DETAILED DESCRIPTION OF THE EXEMPLARY EMBODIMENTS

One aspect of the invention is to provide customization functionality for how a user is able to navigate through pre-recorded or cached content. In one embodiment, the invention relates to a Digital Video Recorder (DVR) system attached to a display device. To that end, the invention may be housed in a set-top box which provides a video signal to a display device for presentation of video content. In addition, the set-top box device may be a DVR system, or may be coupled to a separate DVR system.

In one embodiment, users interact with a set-top device with a user input device to set one or more user preferences for navigation through stored content. Such user preferences may include one or more of content cache size, instant replay time, advance time, FF/REV speeds, slow motion speed and overshoot correction.

Another aspect is to provide a menu interface for receiving the aforementioned user preferences. In one embodiment, the menu interface may be a DVR setup menu accessible to a user via a remote control device. From the navigation customization menu, a user may provide one or more preferences which are then saved in non-volatile memory and used for subsequent content playback.

Figure 1:
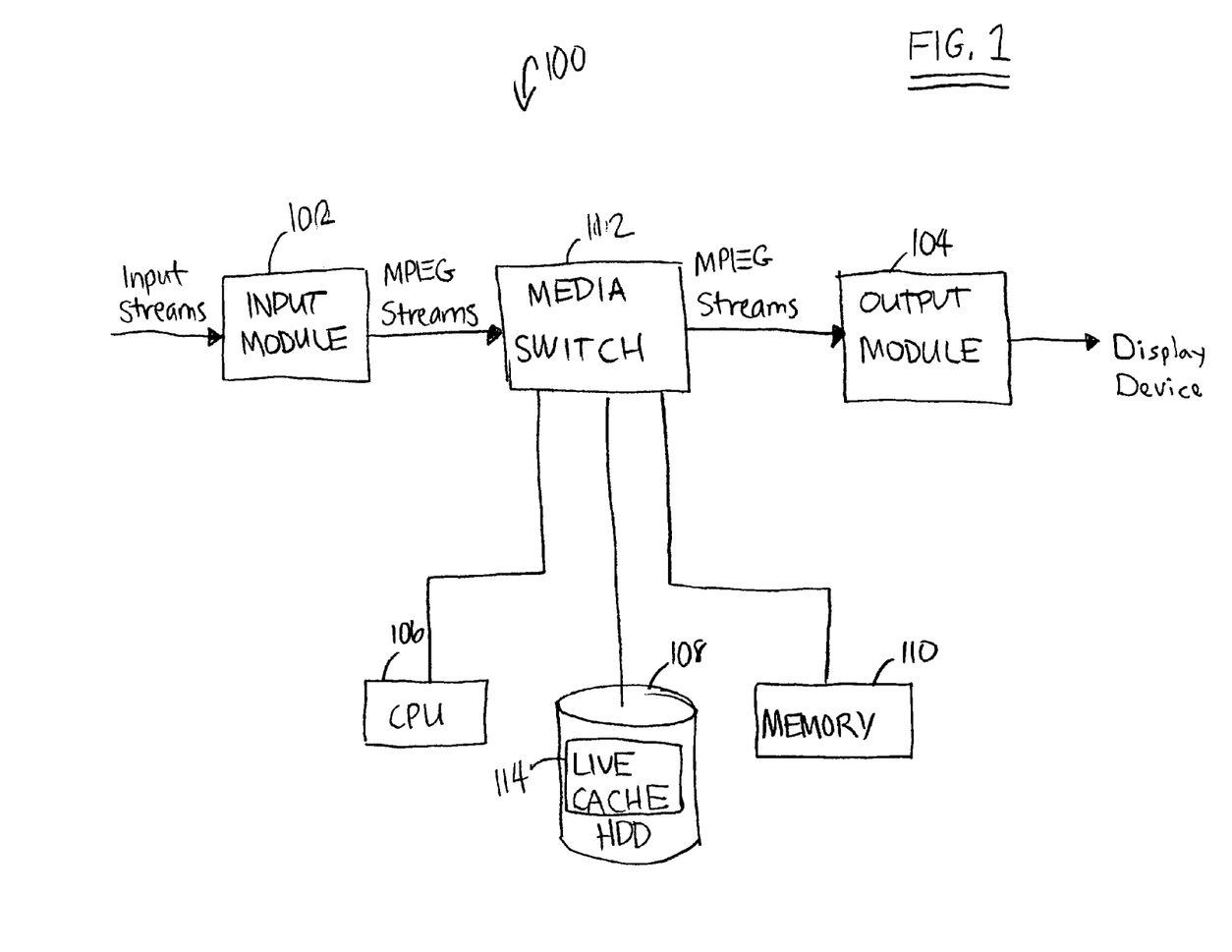
FIG. 1 depicts an embodiment of a system capable of implementing one or more aspects of the invention.

Referring now to the drawings, FIG. 1 illustrates an embodiment of a DVR system 100 capable of implementing one or more aspects of the invention. In the embodiment of FIG. 1, the system 100 includes an input module 102, a media switch 112, and an output module 104. In one embodiment, the input module 102 may accept video input streams in a multitude of forms (e.g., National Television Standards Committee (NTSC), PAL, Digital Satellite System (DSS), Digital Broadcast System (DBS), Advanced Television Standards Committee (ATSC), etc.). DBS, DSS, and ATSC are based on standards called Moving Pictures Experts Group 2 (MPEG2) and MPEG2 Transport. MPEG2 Transport is a standard for formatting the digital data stream from the source transmitter so that a receiver can disassemble the input stream to find programs in the multiplexed signal.

The input module 102 may produce MPEG streams. An MPEG2 transport multiplex supports multiple programs in the same broadcast channel, with multiple video and audio feeds and private data. The input module 102 may also be used to tune the channel to a particular program, extract a specific MPEG program out of it, and feed it into the rest of the system. Analog video signals may be encoded into a similar MPEG format using separate video and audio encoders, such that the remainder of the system is unaware of how the signal was obtained. Information may be modulated into the Vertical Blanking Interval (VBI) of the analog video signal in a number of standard ways. For example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals may be decoded by the input module 102 and passed to the other modules as if they were delivered via a MPEG2 private data channel.

In one embodiment, the media switch 112 mediates between a microprocessor CPU 106, hard disk or other storage device 108, which may or may not include the DVR system's live cache 114, and volatile memory 110. Input streams are converted to an MPEG stream and sent to the media switch 112. The media switch 112 buffers the MPEG stream into memory. If the user is watching real-time broadcast content, the media switch 112 may send the stream to the output module 104, as well as simultaneously write it to the hard disk or storage device 108. When implemented as a computer readable medium having computer executable program code embodied therein, the elements of the present invention are essentially code segments to perform the necessary tasks. The computer executable program code or code segments can be stored in hard disk or storage device 108.

The output module 104 may take the MPEG streams as input and produces an analog video signal according to a particular standard (e.g., NTSC, PAL, or other video standard). In one embodiment, the output module 104 contains an MPEG decoder, on-screen display (OSD) generator, analog video encoder and audio logic. The OSD generator may be used to supply images which will be overlaid on top of the resulting analog video signal. Additionally, the output module 104 can modulate information supplied by the program logic onto the VBI of the output signal in a number of standard formats, including NABTS, CC, and EDS.

Figure 2A:
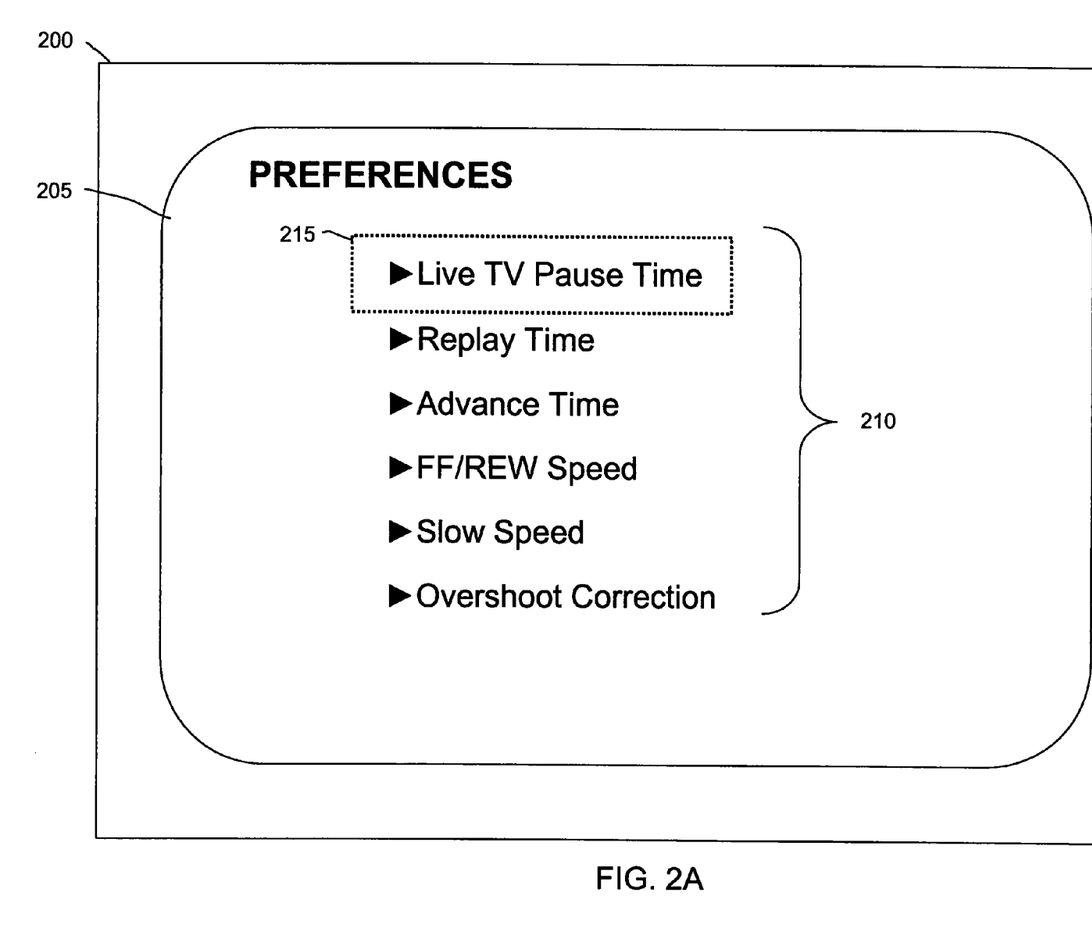
FIGS. 2A-2G depicts various embodiments of graphical user interface screens usable for providing one or more user preferences in a manner consistent with the principles of the invention.

Referring now to FIGS. 2A-2G, depicted are exemplary embodiments of a graphical menu interface usable to provide one or more user preferences for content navigation. In particular, FIG. 2A depicts one embodiment of a screen 205 being displayed on a display device 200. In one embodiment, display device 200 is coupled to the DVR system 100 of FIG. 1. Screen 205 is depicted as displaying a Preferences submenu 210 containing a number of content navigation options. In particular, submenu 210 contains options for Live TV Pause Time, Replay Time, Advance Time, FF/REW Speed, Slow Speed and Overshoot Correction. It should of course be appreciated that submenu 210 may have fewer or additional navigation options than those depicted. Moreover, it should be appreciated that a user may access submenu 210 from a top level (or higher level) user menu of DVR system 100. Where the invention is implemented separate from a DVR-type system (e.g., as a standalone system), submenu 210 may be accessible directly as a top level menu, or alternatively as a submenu to a non-DVR top-level menu.

Continuing to refer to FIG. 2A, using a user input device (e.g., a remote control device), a user may select from the options on submenu 210. For example, in FIG. 2A, a user has moved the selection focus to option 215. By pressing up/down keys on the user input device, a user may move the selection focus up or down the submenu 210.

Figure 2B:
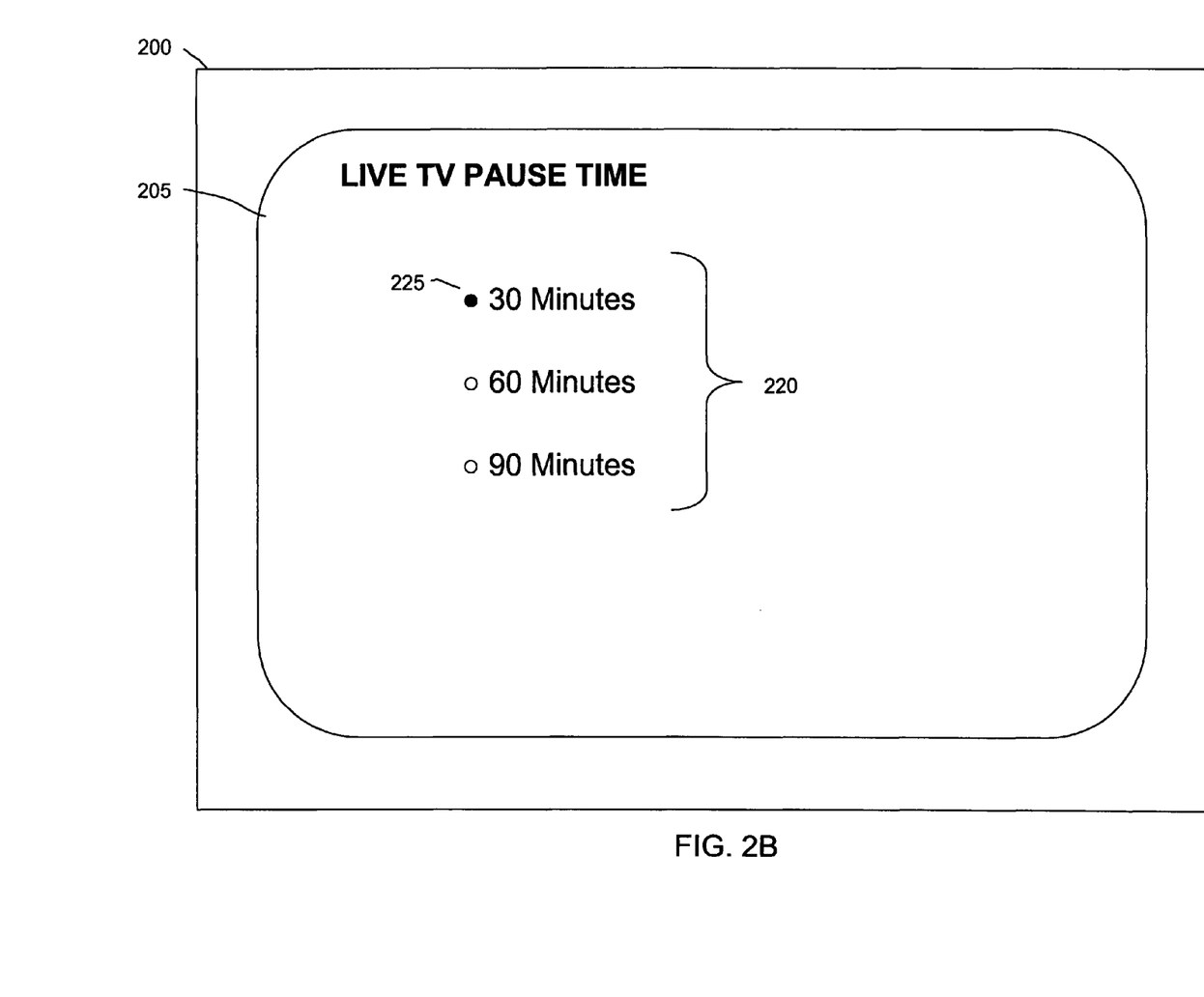

FIG. 2B depicts one embodiment in which a user has selected the Live TV Pause Time option from the submenu 210 of FIG. 2A. From this menu 220, a user may set preferences for how long an associated DVR system should be permitted to cache video content while a user has selected to pause the live content broadcast feed. In some cases, a user may desire to set a longer cache time (or pause time) in order to preserve their viewing location for as long as possible. Alternatively, given the fact that DVR systems have only a limited capacity for storing content, users may desire to minimize the amount of content to be cached in order to avoid prematurely deleting other stored programs. To that end, menu 220 presents several options for how long the system should cache content. In this embodiment, the user has selected option 225 corresponding to a 30-minute pause time. After making this selection, live content will only be cached in a 30-minute moving window. In other words, the user will only have access to the last 30-minutes of a live broadcast, whether by virtual of rewinding through the last 30 minutes of the program, or by pausing the program for 30 minutes. It should of course be understood that menu 220 may be comprised of any number of pause times other than those depicted in FIG. 2B.

Figure 2C:
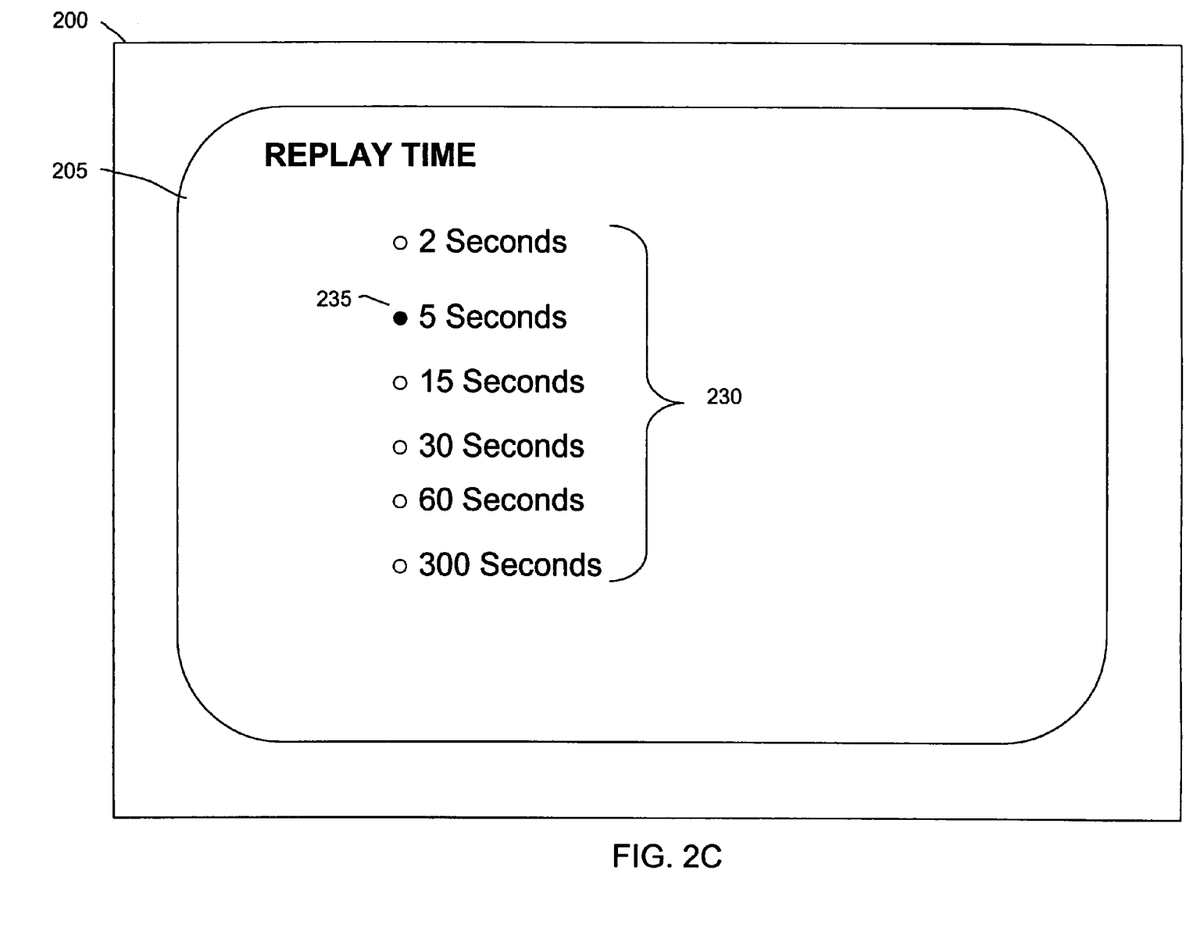

FIG. 2C depicts one embodiment in which a user has selected the Replay Time option from the submenu 210 of FIG. 2A. From the Replay Time menu 230, a user may set how far back the user's viewing location will jump when the user selects a "Replay" option. While many DVR systems may be equipped with a "replay" option, the time period which the viewer is transported to is a fixed value. However, it may be desirable for a user to be able to choose how far back they want the "replay" option to go. In this embodiment, the user has selected option 235 which corresponds to a replay time of 5 seconds. After making this selection, each time the replay option is selected by the user, the user's viewing location within the current program will move back 5 seconds from its current point. It should of course be understood that menu 230 may be comprised of any number of replay times other than those depicted in FIG. 2C. In addition, it should be appreciated that the replay option may be used during playback of a recorded program, or during the viewing of live content.

Figure 2D:
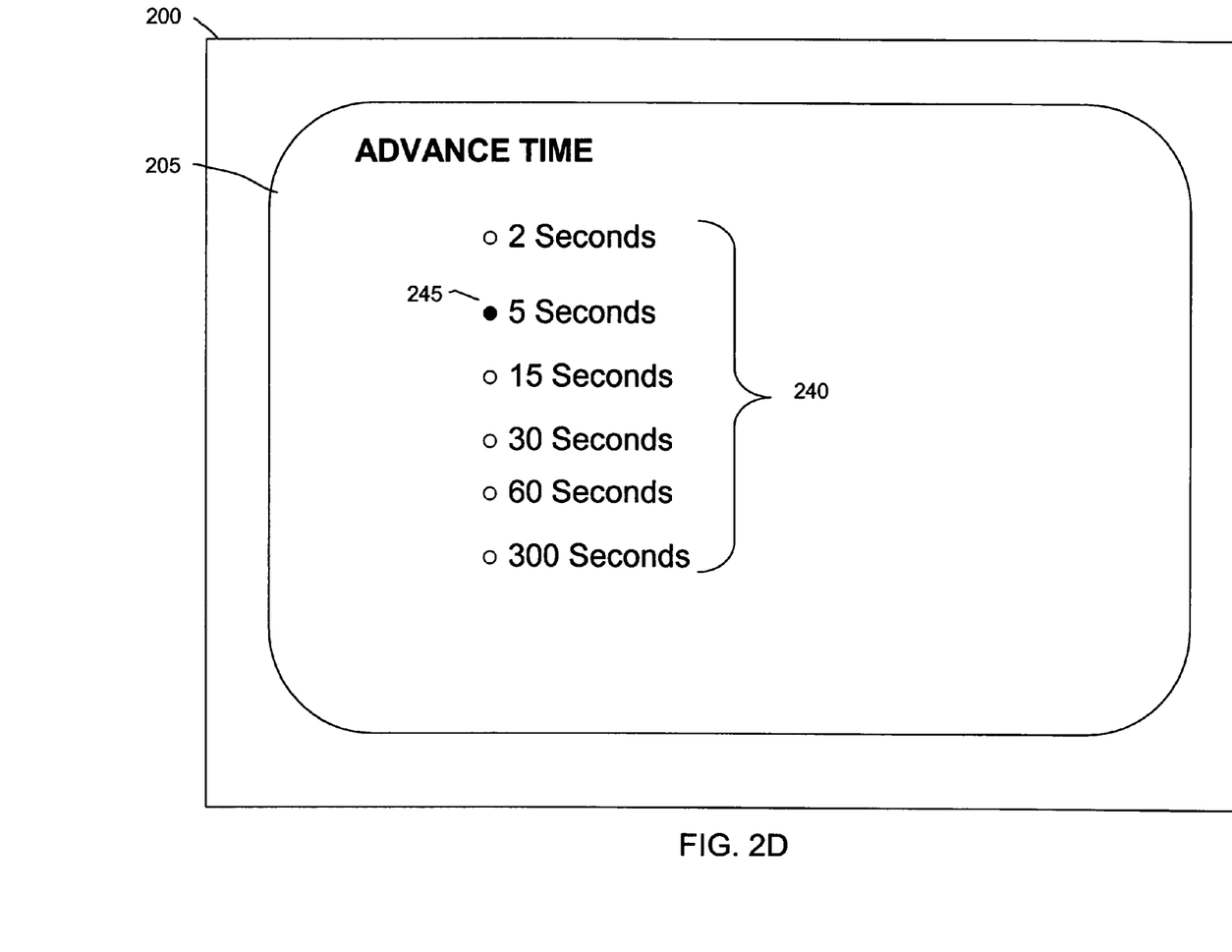

FIG. 2D depicts one embodiment in which a user has selected the Advance Time option from the submenu 210 of FIG. 2A. From the Advance Time menu 240, a user may set how far forward the user's viewing location will jump when the user selects an "Advance" option. While many DVR systems may be equipped with an "Advance" option, the time period which the viewer is transported forward to is a fixed value. However, it may be desirable for a user to be able to choose how far forward they want to advance. In this embodiment, the user has selected option 245 which corresponds to an advance time of 5 seconds. After making this selection, each time the advance option is selected by the user, the user's viewing location within the current program will move forward by 5 seconds from its current point. As with the previous options, it should of course be understood that menu 240 may be comprised of any number of replay times other than those depicted in FIG. 2D. In addition, it should be appreciated that the advance option may be used during playback of a recorded program, or during the viewing of live content where the user has paused and/or rewound through at least a portion of cached live content.

Figure 2E:
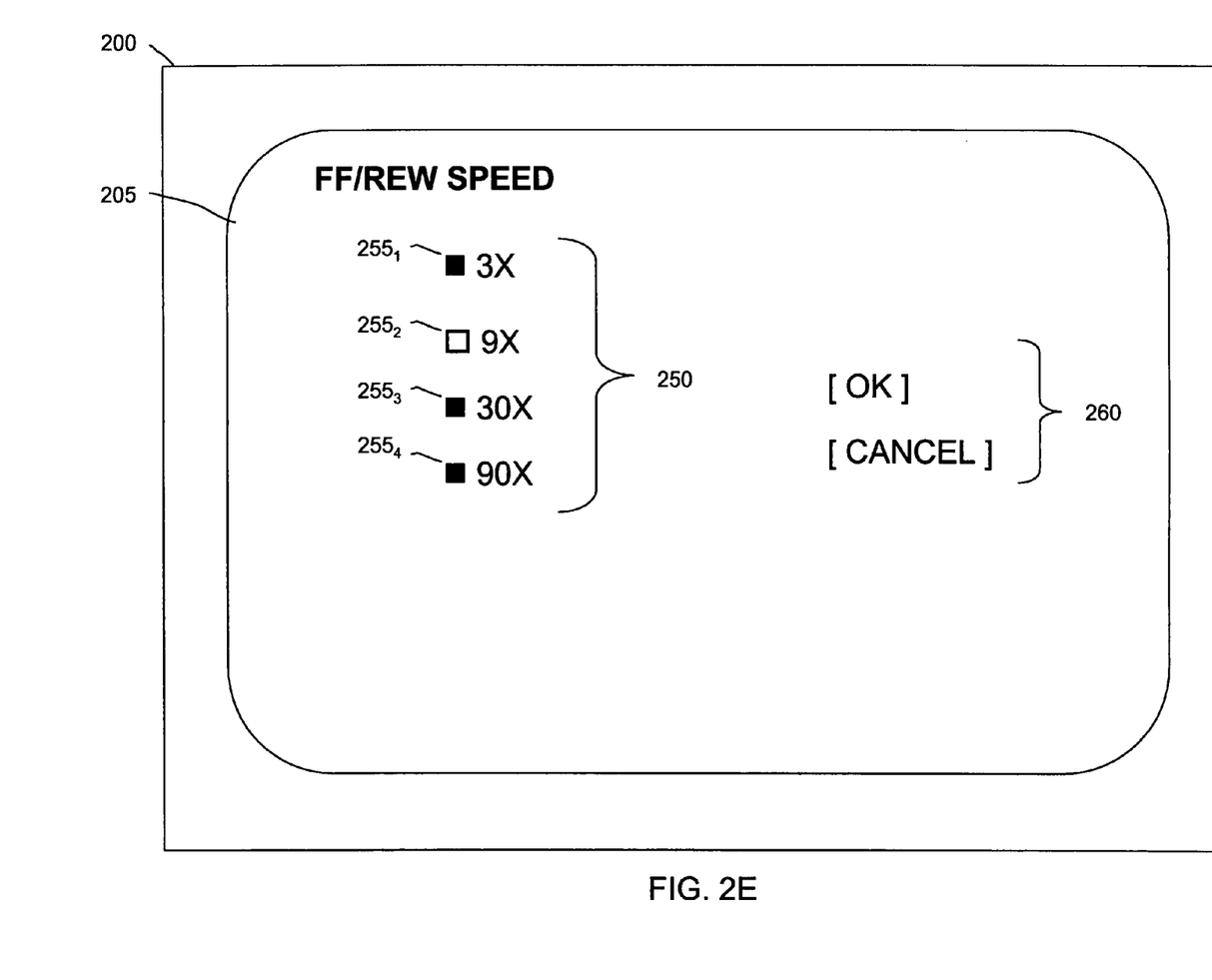

FIG. 2E depicts one embodiment in which a user has selected the FF/REW Speed option from the submenu 210 of FIG. 2A. From the FF/REW Speed menu 250, a user may set how fast the user's viewing location should move through recorded and/or cached video content when the fast forward (FF) and rewind (REW) options are selected from a DVR-type system. While many DVR systems may be equipped with FF and REW options, the speed at which a viewer is able to navigate through video content is fixed. However, it may be desirable for a user to be able to customize how quickly they are able to navigate through stored and/or cached content.

Unlike with the previous user preference menus, a user may make multiple selections for FF/REW speed. This is due to the fact that repeatedly selecting the FF option (e.g., by pressing the FF key on a remote control more than once) will incrementally increase the speed at which the video content is being fast forwarded through. For example, in the embodiment of FIG. 2E a user has selected option $255_1$, $255_2$ and $255_4$, but not option $255_2$. This user preference setting will enable the user to navigate through (either FF or REW) stored and/or cached content at 3 times (3×) the normal speed with one press of the FF/REW key. A second press will increase the speed the FF or REW to 30 times (30×) the normal speed, while a third press will increase the speed of navigation to 90 times (90×) the normal speed. Once the user has selected what the various FF and REW speeds will be, menu 250 may be exited by selected from menu 260 (i.e., either 'OK' to accept or 'CANCEL' to decline changes made). As with the previous options, it should of course be understood that menu 250 may be comprised of any number of navigation speed other than those depicted in FIG. 2E. In addition, it should be appreciated that the FF/REW options may be used during playback of a recorded program, or during the viewing of live content where the user has paused and/or rewound through at least a portion of cached live content.

Figure 2F:
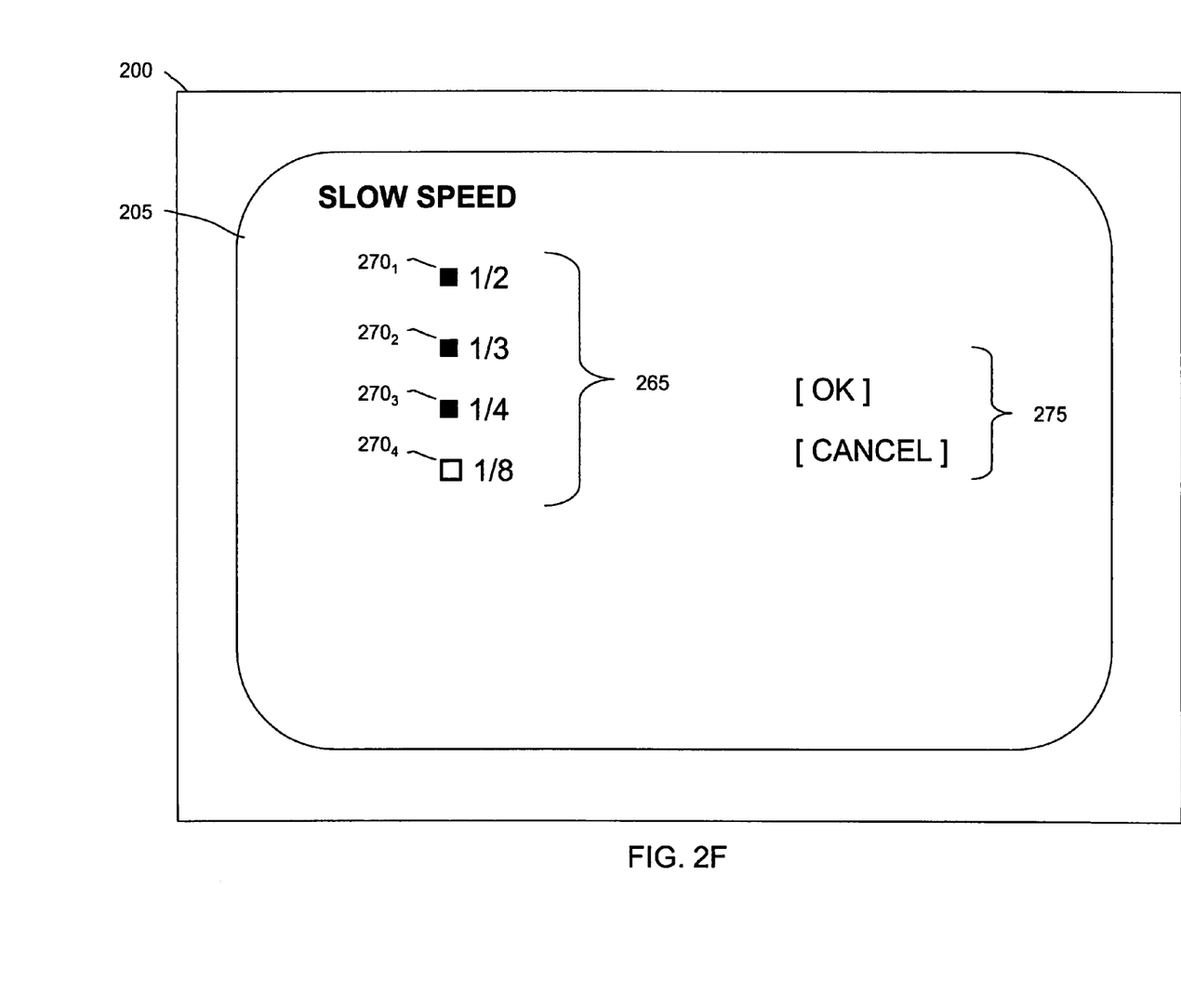

FIG. 2F depicts one embodiment in which a user has selected the Slow Speed option from the submenu 210 of FIG. 2A. From the Slow Speed menu 265, a user may set how slow the user's viewing location will advance through recorded and/or cached video content when the 'Slow' option is selected from a DVR-type system. While many DVR systems may be equipped with a 'Slow' option, the speed at which a viewer is able to slowing navigate through video content is fixed. However, it may be desirable for a user to be able to customize how slowly they are able to navigate through stored and/or cached content.

As with the FF/REW Speed menu 250, a user may make multiple selections for the Slow Speed menu 265. This is due to the fact that repeatedly selecting the 'Slow' option (e.g., by pressing the 'Slow' key on a remote control more than once) will incrementally decrease the speed at which the video content is being presented. For example, in the embodiment of FIG. 2F a user has selected option $270^1$, $270_2$ and $270_3$, but not option $270_4$. This user preference setting will enable the user to slow the speed of presentation of the stored or cached content to ½ the normal speed with one press of the 'Slow' key. A second press will decrease the speed of the presentation to ⅓ the normal speed, while a third press will decrease the speed of navigation to ¼ the normal speed. Once the user has selected what the various 'Slow' speeds will be, menu 265 may be exited by selected from menu 270 (i.e., either 'OK' to accept or 'CANCEL' to decline changes made). As with the previous options, it should of course be understood that menu 265 may be comprised of any number of slow navigation speed other than those depicted in FIG. 2F. In addition, it should be appreciated that the 'Slow' options may be used during playback of a recorded program, or during the viewing of live content where the user has paused and/or rewound through at least a portion of cached live content.

Figure 2G:
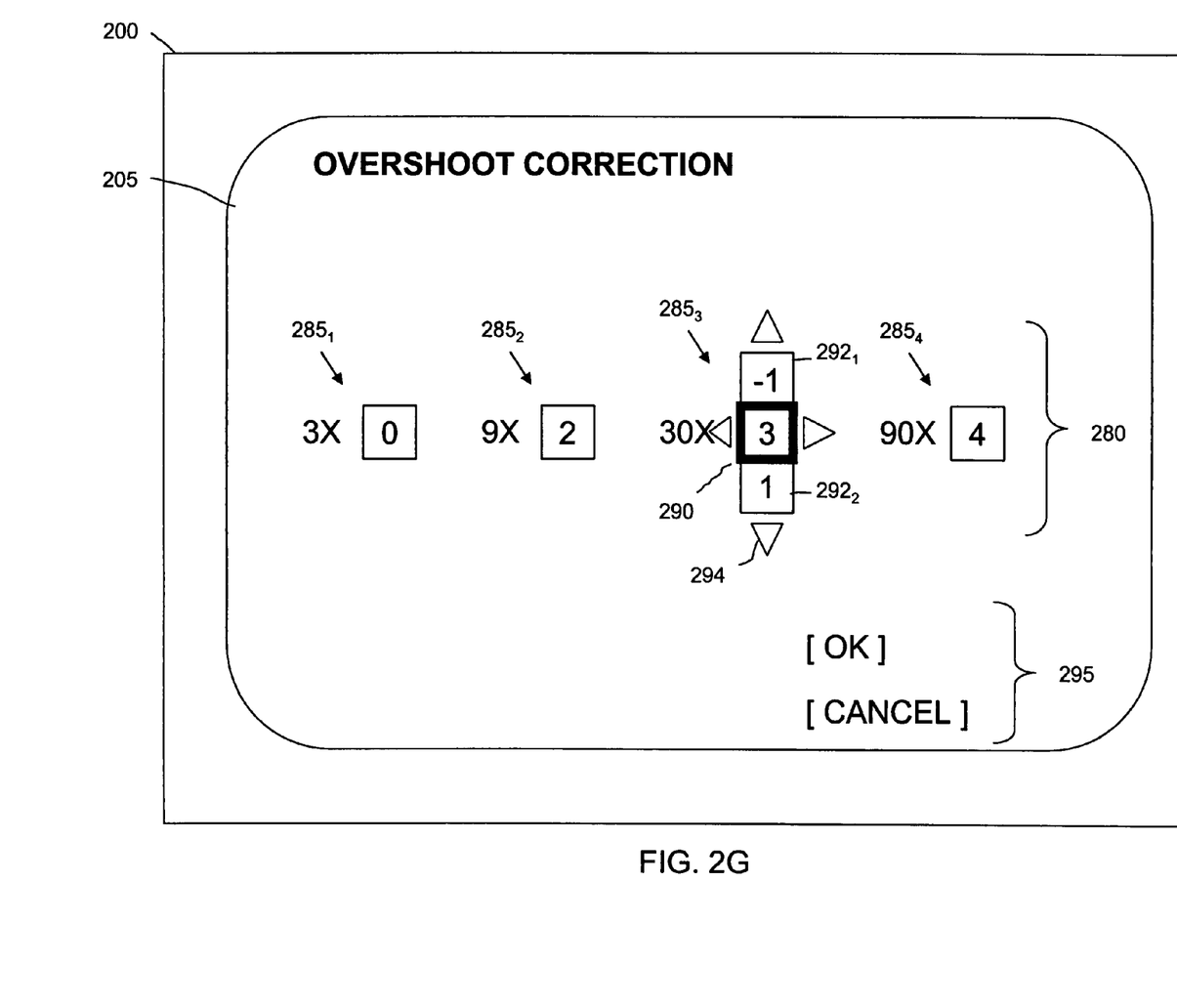

FIG. 2G depicts one embodiment in which a user has selected the Overshoot Correction option from the submenu 210 of FIG. 2A. From the Overshoot Correction menu 280, a user may set the length of time (e.g., in seconds) which is used to compensate for the delay in reaction time when ending a FF or REW operation. For example, several seconds may pass between when a person sees a desired point in a stored program (e.g., end of a commercial) and when they are able to stop fast forwarding through the program (e.g., by pressing a play button). As such, many DVR systems are equipped with a overshoot correction feature which actually moves the point of viewing back by some predetermined amount when the user indicates that the FF/REW operation should end. However, it may be desirable for a user to be able to customize the overshoot time since different users have different reaction time. Moreover, different FF and REW speeds require different overshoot times as well.

As such, FIG. 2G depicts how a user may set their preferences for overshoot correction times for each of a plurality of FF/REW speeds. In particular, menu 280 is depicted with a plurality of overshoot correction options $285_1$-$285_4$ corresponding to the various available speed options for FF and REW. Selecting or focusing (e.g., with a user input device) on one of the overshoot corrections options $285_1$-$285_4$ will, in the embodiment of FIG. 2G, enable the user to either increase or decrease the default overshoot correction for that particular speed option. For example, in the embodiment of FIG. 2G, the user has focused on overshoot correction option $285_3$. In this embodiment, the current overshoot correction 290 is highlighted (or otherwise demarcated) to the user. In one embodiment, the current overshoot correction 290 is a number of seconds, although other time-based values may similarly be used. Arrows 294 may also be provided to indicate that the current overshoot correction 290 may be increased by providing an 'up' instruction, or may be decreased by provided a 'down' instruction. Moreover, side arrows may be provided to indicate that the user may scroll to the left or to the right in order to switch to one of the other overshoot correction options. In one embodiment, 'up' instructions, 'down' instructions and/or 'left/right' instructions may be provided by any user input means, including but not limited to the arrow buttons on a remote control device.

Continuing to refer to FIG. 2G, values $292_1$ and $292_2$ indicate how the current overshoot correction 290 will be modified by providing an 'up' instruction or a 'down' instruction, respectively. While in the embodiment of FIG. 2G, values $292_1$ and $292_2$ indicate that the current overshoot correction 290 will increase or decrease by the value of 1 with each up/down instruction, it should be appreciated that the current overshoot correction 290 may be incremented by any other value as well. Moreover, it should of course be understood that menu 280 may be comprised of any number of overshoot corrections other than those depicted in FIG. 2G. In addition, it should be appreciated that the overshoot correction feature may be used during FF/REW of a recorded program, or during the FF/REW of cached live content. Once the user has selected what the various overshoot corrections will be, menu 280 may be exited by selected from menu 295 (i.e., either 'OK' to accept or 'CANCEL' to decline changes made).

Figure 3:
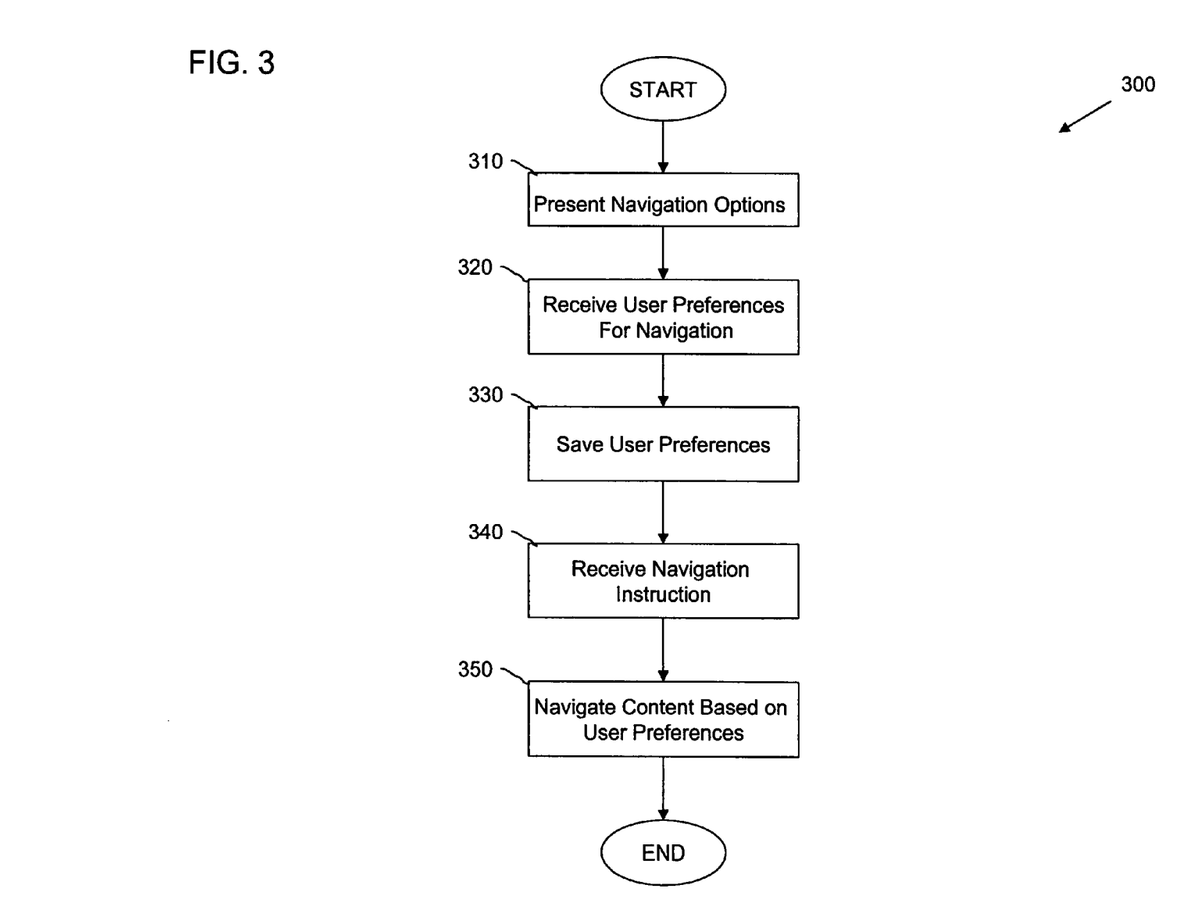
FIG. 3 is a flow diagram of one embodiment of a process for implementing one or more aspects of the invention.

FIG. 3 depicts one embodiment of a process for providing one or more user preferences to customize the navigation of video content. In particular, process 300 begins with block 310 where a user is presented with one or more navigation options. In one embodiment, these navigation options may be presented to a user on a display device (e.g., display device 200) by a system that is associated with or integrated with a DVR system (e.g., DVR system 100). Moreover, a graphical interface menu (e.g., preferences submenu 210) may be used to present the navigation options on the display device, which options may include, for example, options to modify Live TV Pause Time, Replay Time, Advance Time, FF/REW Speed, Slow Speed and/or Overshoot Correction.

Process 300 continues to block 320 where one or more user preferences are received from a user. While in one embodiment, the user preferences may be provided using a user input device (e.g., remote control) operated in connection with a graphical menu interface, it should equally be appreciated that such user preferences may be provided by other input means (e.g., setting preferences online, etc.). Moreover, the user preferences may be provided to directed to a DVR system (e.g., DVR system 100), or alternatively to a standalone device that is in communication with a DVR system. Any such user preferences may be then be saved at block 330 in non-volatile memory of, for example, the DVR system or a standalone system. Saved user preferences may then be used for processing all subsequent navigation instructions.

Process 300 then continues to block 340 where a navigation instruction is received from the user. Such instruction may be received during, for example, playback of a recorded program or during viewing of cached live content. In either case, the navigation instruction may include any one of a FF, REW, pause, advance, replay, etc. instruction. The navigation instruction may be provided using a remote control device, or any other user input means. In one embodiment, the navigation instruction may be provided to and received by a DVR system, or a standalone system in communication with the DVR system.

At block 350, the content that is being played back (or cached) will be navigated in response to the navigation instruction and in accordance with the previously provided user preferences. For example, where the navigation instruction is a FF instruction, upon receiving such an instruction, the rate at which the content is being presented will increase to a FF speed which is higher than the normal rate, and in accordance with the previously-provided user preference(s) corresponding to FF speeds.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for customizing content navigation comprising:
   presenting one or more content navigation options to a user;
   receiving, by a processor, from the user, in response to said presenting; a navigation preference for navigating through a plurality of individual stored videos;
   saving said navigation preference to a non-volatile memory;
   receiving, by the processor, a navigation instruction from said user; and
   navigating through a current video in response to said navigation instruction in accordance with said navigation preference, wherein the current video is one of the plurality of individual stored videos.

2. The method of claim 1, wherein presenting said one or more content navigation options comprises displaying a graphical menu interface containing said one or more content navigation options on a display device.

3. The method of claim 1, wherein said one or more content navigation options include at least one of a cache length, an instant replay time, an advance time, a fast-forward speed, a reverse speed, a slow motion speed and an overshoot correction.

4. The method of claim 3, wherein said cache length is a length of time that a broadcast program will be automatically stored in a cache memory and available for navigation by said user.

5. The method of claim 3, wherein said fast-forward speed comprises a plurality of fast-forward speeds at which the user may choose to move through said plurality of individual stored videos, and wherein said reverse speed comprises a plurality of reverse speeds at which the user may choose to move backwards through said plurality of individual stored videos.

6. The method of claim 5, wherein said overshoot correction comprises a plurality of overshoot corrections, wherein each of said plurality of overshoot corrections is specific to said plurality of fast-forward speeds, and wherein said plurality of overshoot corrections enable the user to compensate for user reaction time when fast forwarding through said plurality of individual stored videos.

7. The method of claim 1, further comprising storing said plurality of individual stored videos on a non-volatile memory of a digital video recorder.

8. The method of claim 1, further comprising, prior to said receiving the navigation instruction, presenting the current video on a display device at a speed.

9. The method of claim 8, wherein said navigation instruction is a fast forward instruction, the method further comprising:
   accessing said navigation preference from the non-volatile memory in response to said navigation instruction; and
   increasing said speed in accordance with said navigation preference.

10. The method of claim 1, wherein navigating through said current video comprises modifying, in response to said navigation instruction, a speed at which said current video is being presented on a display device to said user.

11. An apparatus comprising:
   a memory containing one or more instruction sequences; and
   a processor coupled to said memory, said processor to execute the one or more instructions to,
   present one or more content navigation options to a user,
   receive from the user, in response to said content navigation options, a navigation preference for navigating through a plurality of individual stored videos,
   save said navigation preference to a non-volatile memory,
   receive a navigation instruction from said user, and
   navigate through a current video in response to said navigation instruction in accordance with said navigation preference, wherein the current video is one of the plurality of individual stored videos.

12. The apparatus of claim 11, wherein said one or more content navigation options are displayed in a graphical menu interface on a display device.

13. The apparatus of claim 11, wherein said one or more content navigation options include at least one of a cache length, an instant replay time, an advance time, a fast-forward speed, a reverse speed, a slow motion speed and an overshoot correction.

14. The apparatus of claim 13, wherein said cache length is a length of time that a broadcast program will be automatically stored in a cache memory and available for navigation by said user.

15. The apparatus of claim 13, wherein said fast-forward speed comprises a plurality of fast-forward speeds at which the user may choose to move through said plurality of individual stored videos, and wherein said reverse speed comprises a plurality of reverse speeds at which the user may choose to move backwards through said plurality of individual stored videos.

16. The apparatus of claim 15, wherein said overshoot correction comprises a plurality of overshoot corrections, wherein each of said plurality of overshoot corrections is specific to said plurality of fast-forward speeds, and wherein said plurality of overshoot corrections enable the user to compensate for user reaction time when fast forwarding through said plurality of individual stored videos.

17. The apparatus of claim 11, wherein said processor is further to execute the one or more instructions to store said plurality of individual stored videos on a non-volatile memory of a digital video recorder.

18. The apparatus of claim 11, wherein said processor is further to execute the one or more instructions to present, prior to receiving the navigation instruction, said current video on a display device at a speed.

19. The apparatus of claim 18, wherein said navigation instruction is a fast forward instruction, and wherein said processor is further to execute the one or more instructions to,
   access said navigation preference from the non-volatile memory in response to said navigation instruction, and
   increase said speed in accordance with said navigation preference.

20. The apparatus of claim 11, wherein said processor to navigate through said current video is to modify, in response to said navigation instruction, a speed at which said current video is being presented on a display device to said user.

21. A non-transitory computer readable medium having computer executable program code embodied therein to navigate content, the medium having:
   computer executable program code to present one or more content navigation options to a user;
   computer executable program code to receive from the user, in response to said one or more content navigation options, a navigation preference for navigating through a plurality of individual stored videos;
   computer executable program code to save said navigation preference to a non-volatile memory;
   computer executable program code to receive a navigation instruction from said user; and
   computer executable program code to navigate through a current video in response to said navigation instruction in accordance with navigation preference, wherein the current video is one of the plurality of individual stored videos.

22. The medium of claim 21, wherein said computer executable program code to present said one or more content navigation options comprises computer executable program code to display a graphical menu interface containing said one or more content navigation options on a display device.

23. The medium of claim 21, wherein said one or more content navigation options include at least one of a cache length, an instant replay time, an advance time, a fast-forward speed, a reverse speed, a slow motion speed and an overshoot correction.

24. The medium of claim 23, wherein said cache length is a length of time that a broadcast program will be automatically stored in a cache memory and available for navigation by said user.

25. The medium of claim 23, wherein said fast-forward speed comprises a plurality of fast-forward speeds at which the user may choose to move through said plurality of individual stored videos, and wherein said reverse speed comprises a plurality of reverse speeds at which the user may choose to move backwards through said plurality of individual stored videos.

26. The medium of claim 25, wherein said overshoot correction comprises a plurality of overshoot corrections, wherein each of said plurality of overshoot corrections is specific to said plurality of fast-forward speeds, and wherein said plurality of overshoot corrections enable the user to compensate for user reaction time when fast forwarding through said plurality of individual stored videos.

27. The medium of claim 21, further comprising computer executable program code to store said plurality of individual stored videos on a non-volatile memory of a digital video recorder.

28. The medium of claim 21, further comprising computer executable program code to present, prior to said receiving the navigation instruction, said current video on a display device at a speed.

29. The medium of claim 28, wherein said navigation instruction is a fast forward instruction, the medium further having:
   computer executable program code to access said navigation preference from the non-volatile memory in response to said navigation instruction, and
   computer executable program code to increase said speed in accordance with said navigation preference.

30. The medium of claim 21, wherein said computer executable program code to navigate through said current video comprises computer executable program code to modify, in response to said navigation instruction, a speed at which said current video is being presented on a display device to said user.

* * * * *